United States Patent [19]
Cooper

[11] Patent Number: 5,618,146
[45] Date of Patent: Apr. 8, 1997

[54] HAY ROLL TRANSPORTER

[76] Inventor: Edmund E. Cooper, Rte. 1, Box 275, Copan, Okla. 74022

[21] Appl. No.: 634,981

[22] Filed: Apr. 19, 1996

[51] Int. Cl.⁶ .................................................. A01D 90/00
[52] U.S. Cl. ..................... 414/24.5; 414/789.7; 414/502; 414/521; 414/549; 414/551; 414/679; 414/667
[58] Field of Search .................... 414/24.5, 789.7, 414/501, 502, 503, 505, 510, 512, 514, 521, 546, 549, 551, 679, 671, 667; 296/6, 8, 190

[56] References Cited

U.S. PATENT DOCUMENTS

| | | |
|---|---|---|
| 2,670,089 | 2/1954 | Paterson . |
| 2,816,676 | 12/1957 | Avery et al. . |
| 2,860,794 | 11/1958 | Paluck . |
| 3,034,237 | 5/1962 | Wolfe et al. . |
| 3,070,244 | 12/1962 | Lull . |
| 3,604,576 | 9/1971 | Poccard ................................. 414/501 |
| 3,722,722 | 3/1973 | Blair ..................................... 414/505 |
| 3,766,725 | 10/1973 | Marsh .................................... 56/364 |
| 3,876,055 | 4/1975 | Tyznik ..................................... 198/7 |
| 3,918,595 | 11/1975 | Godfrey et al. ...................... 414/789.7 |
| 3,921,837 | 11/1975 | Vandewater . |
| 4,161,322 | 7/1979 | Ekeborg et al. ......................... 280/6 R |
| 4,175,900 | 11/1979 | Etzler ..................................... 414/24.5 |
| 4,204,792 | 5/1980 | Wynn et al. ............................. 414/501 |
| 4,329,101 | 5/1982 | Green et al. ............................. 414/501 |
| 4,360,302 | 11/1982 | Askov et al. ............................ 414/24.5 |
| 4,427,090 | 1/1984 | Fredriksen et al. ..................... 296/190 |
| 4,431,357 | 2/1984 | Butler .................................... 414/24.5 |
| 4,573,845 | 3/1986 | Carpenter ............................... 414/24.5 |
| 4,619,570 | 10/1986 | Siebenga .................................. 414/39 |
| 4,971,504 | 11/1990 | Klompien ............................... 414/24.5 |
| 5,094,581 | 3/1992 | Lamb ..................................... 414/24.5 |
| 5,236,294 | 8/1993 | Willis .................................... 414/24.5 |
| 5,277,537 | 1/1994 | Druse .................................... 414/470 |
| 5,305,844 | 4/1994 | Ducote ................................. 180/24.01 |

*Primary Examiner*—Karen B. Merritt
*Assistant Examiner*—Douglas Hess
*Attorney, Agent, or Firm*—Richard C. Litman

[57] ABSTRACT

A hay roll transporter is adapted to pick up very large hay rolls in the field, carry them to another location, and off load them for storage or further transport. The transporter is in the general configuration of a truck, and may be driven on public roads and also as an agricultural vehicle in the field. The transporter is capable of carrying multiple large hay rolls, which rolls may each exceed one thousand pounds. The rolls are loaded in two rows side by side on the truck bed, with rolls being added alternatingly to each row for lateral balance of the truck. A front ramp with movable forks thereon is used to pick up each roll and load it on the front of the truck, whereupon the roll is transferred to a bed rack which carries and deposits the roll on the bed of the transporter truck. The front rack is laterally translatable from one side to the other of the front of the truck in order to pick up and deposit the hay rolls in two side by side rows, and the truck cab is likewise laterally movable in order to provide a clear area for the loading of each roll from the front of the truck. The transporter may be operated, and the hay rolls picked up, carried, and delivered, by a single driver or operator. The front ramp and forks are capable of stacking the hay rolls to form at least two vertical rows when off loading.

19 Claims, 6 Drawing Sheets

HAY ROLL TRANSPORTER

FIELD OF THE INVENTION

The present invention relates generally to powered and automated mechanized agricultural, equipment, and more specifically to a roadable truck which is specially constructed to pick up relatively large rolled bales of hay or the like, distribute them evenly laterally and longitudinally on the truck bed, transport them to the desired storage or dropoff site, and offload them as desired. The present truck is capable of stacking such rolls in up to two vertical rows when offloading, and is operable by a single driver or operator when loading or unloading.

BACKGROUND OF THE INVENTION

As automated farm or agricultural equipment has developed over the years, the size and mass of the end products has generally been increased to the point that automated or mechanized means is required for handling the product for transport from field to other storage area. Initially, hay was shocked into bundles which were manually loaded on a wagon for transport from the field. Later, automatic baling machines were developed which pick up the hay from the mown hayrow, bale it, and deposit the bales on a wagon or bed for transport. Such bales have a size and weight which is at the practical limit for manual manipulation by a single strong individual, as the mechanized or automated equipment generally precludes any need for such manual handling of the bales.

Still later, machines have been developed which are moved along the mown hayrow and roll the cut hay into relatively large diameter hay rolls, often six to eight feet in diameter and weighing on the order of a ton or more, depending to a great extent on the moisture content as well as other factors. Obviously, such large and massive hay rolls cannot be manually moved or handled; mechanized equipment is required.

Various forms of automated mechanized equipment have been developed for the handling of standard rectangular hay bales, providing for picking them up from the field, transporting them to a barn or other storage area, and depositing them for storage or further transport as desired. However, very little specialized equipment has been developed for handling the larger round hay rolls, other than various tine and other attachments for conventional tractors, for picking up such hayrolls singly and transferring them to yet another conventional vehicle for movement. The rolls require yet another specially equipped conventional tractor or the like for offloading when the rolls are delivered to their storage or transfer site.

Accordingly, the need arises for a specialized transporter which is adapted to pick up such hay rolls in the field, distribute them evenly over the bed of the vehicle, and transport them to the storage or other transfer site as desired. The vehicle and all its functions must be capable of being operated by a single individual and of travel over public roads as a conventional truck, as well as in the field, and should also provide for offloading the hay rolls at the offloading site and stacking them for compact storage or carriage by another vehicle, in stacks up to two rolls high in order to save horizontal space.

DESCRIPTION OF THE PRIOR ART

U.S. Pat. No. 2,670,089 issued to Rex M. Paterson on Feb. 23, 1954 describes a Sweep Or Like Attachment For Tractors generally comprising a series of tines attachable to the rear end of a tractor. A front attachment is shown which is capable of lifting and holding a hay roll or the like, but as the device is merely an attachment to an existing tractor, no storage or carriage means is provided on the vehicle bed, or transfer thereto, as provided by the present invention.

U.S. Pat. No. 2,816,676 issued to Fred J. Avery et al. on Dec. 17, 1957 describes a Scoop Unit for attachment to a fork lift or the like. The device may be capable of picking up a single hay roll and carrying it singly to another point, but cannot store or carry multiple rolls, as with the present invention. Further, the present invention is a truck which may be licensed and driven on the road, not merely a specialized vehicle which is confined to a narrow operating environment.

U.S. Pat. No. 2,860,794 issued to Casmir Paluck on Nov. 18, 1958 describes a Tractor Loader Attachment along the lines of one embodiment of the Paterson device discussed above. Again, the device is capable of carrying only a single object the size and mass of a hay roll at any one time, and hence does not anticipate the need for storage means on the vehicle or for distributing equally a load of multiple hay rolls. The Paluck device is merely an attachment for a specialized off-road vehicle, in the manner of the devices of the Paterson and Avery et al. attachments discussed above.

U.S. Pat. No. 3,034,237 issued to Walter W. Wolfe et al. on May 15, 1962 describes a Multi-Function Attachments Carrier For Farm Loaders And The Like. The device is basically a blade, as in a snow plow blade or the like, with various attachments provided to modify the blade to a scoop configuration, or to widen the blade. Accordingly, no relationship is seen to the present invention.

U.S. Pat. No. 3,070,244 issued to Le Grand H. Lull on Dec. 25, 1962 describes a Loader of the front end loader configuration and having a variety of attachments for the lifting and loading of various articles or materials. Again, no means is provided for the carriage of multiple units of the article being lifted or loaded, and the vehicle is a specialized, off-road machine not adapted for use on public roads as with the present hay roll transporter truck.

U.S. Pat. No. 3,766,725 issued to Preston L. Marsh on Oct. 23, 1973 describes a Farm Crop Handling Apparatus comprising a plurality of tines eccentrically located within a stripper drum. The device is merely an attachment for existing agricultural machinery, and, no integral drive means is provided. No storage means is provided, and the device cannot pick up crops which have already been gathered, rolled, or baled in the field.

U.S. Pat. No. 3,876,055 issued to Henry N. Tyznik on Apr. 8, 1975 describes a Farm Waste Material Handler comprising a plurality of augers for picking up loose material (manure, etc. . . .). The device is strictly an attachment for a farm tractor, rather than a complete roadable truck or other vehicle. No means is provided to pick up or carry single or plural large packed masses of material, such as hay rolls, nor is the device adapted for use on a truck or vehicle for use on public roads.

U.S. Pat. No. 3,921,837 issued to Lloyd L. Vandewater on Nov. 25, 1975 describes a Round Bale Handling Attachment For A Tractor comprising a pair of spaced apart tines extending forwardly of the upper edge of a front end loader bucket. The tines are used to spear the hay roll, rather than to lift it from underneath, as in the present transporter. Vandewater does not disclose any means of carrying more than a single roll, and no means is provided for use of the tines on a conventional truck usable on public roads.

U.S. Pat. No. 4,161,322 issued to Bo-Gunnar Ekeborg et al. on Jul. 17, 1979 discloses Vehicles Having Reduced Tilting Of The Superstructure Thereof Relative To The Wheel Axle Support Therefor. The cab of a flat bed vehicle is pivotally mounted on a longitudinal axis on one lower side thereof. The opposite side is linked to one side of the rigid front axle. The cab pivots relative to the bed as one side of the axle moves up and down over uneven terrain. The cab of the present hay roll transporter truck is also movable relative to the rest of the vehicle, but translates laterally to the side opposite the front lifting ramp, to enable hayrolls to be transferred straight from the front to the back of the transporter. The Ekeborg et al. patent also fails to disclose any means for lifting articles from any side of the truck, onto the flat bed of the truck, as provided by the present invention.

U.S. Pat. No. 4,175,900 issued to John L. Etzler on Nov. 27, 1979 describes a Plug-In Bale Mover comprising plural tines attachable to a front end loader bucket, or alternatively to the rear lifting arms, on a tractor. The device is quite similar to the Vandewater device discussed above, and accordingly no means for the carriage of multiple hay rolls is disclosed, nor is the device adaptable to a truck vehicle usable on public roads.

U.S. Pat. No. 4,573,845 issued to Marvin L. Carpenter on Mar. 4, 1986 describes a Self-Loading Trailer providing for the carriage of relatively large hay rolls thereon. As the device is a trailer, the loading means is located at the back end, since the front end is secured to the towing vehicle by the trailer tongue. The loading forks are centrally located on the back end of the trailer, and cannot be laterally translated from one side to the other. Accordingly, only a single row of hay rolls may be placed on the Carpenter trailer. The forks are adapted to move forwardly to push a hay roll toward the front end of the trailer after loading, but do not fully support the roll, as with the present invention. Rather, the roll is supported by a plurality of rollers which comprise the floor of the trailer. The trailer is relatively light and is not self-propelled, as with the present transporter.

U.S. Pat. No. 4,619,570 issued to Charles Siebenga on Oct. 28, 1986 describes a Bale Loading-Stacking Apparatus comprising a pair of lift forks disposed on the back end of a flat bed truck. The forks lift the bales (up to two at a time) to the level of the bed and pivot to stack the bales on the rear end of the bed. Subsequent bales are pushed against the first bales to push them forward on the truck bed. The bed may be tilted, as in a dump truck, to off load the bales. The Siebenga lifting forks cannot translate laterally to load a double row of bales or rolls, as with the present hay roll transporter; Siebenga provides no means to move the bales directly along tile bed, as with the present invention; and with the Siebenga lifting forks located at the back end of the bed, maneuvering the truck for loading is awkward at best and would likely require a spotter or additional person to assist the driver in positioning the forks.

U.S. Pat. No. 5,094,581 issued to George K. Lamb on Mar. 10, 1992 describes a Bale Handling Apparatus comprising a modified end loader bucket with an articulated grapple thereon. The linkage provides for the lowering of the grapple when the bucket is raised, to grasp a bale or other article therebetween, and for the raising of the grapple when the bucket is lowered, to release an article therein. No truck or roadable transport vehicle is disclosed in the Lamb patent, and no means for carriage of multiple bales or rolls is provided.

U.S. Pat. No. 5,277,537 issued to Charles R. Druse, Sr. on Jan. 11, 1994 describes a Bale Carrier comprising a goose neck trailer having a plurality of pivotable racks thereon. The rolled bales must be loaded onto the trailer from the sides, with one bale held by each rack during transport, unlike the present invention where the racks are used only to position the rolls on the truck bed. The Druse, Sr. racks cannot be relocated relative to the trailer bed, as with the movable racks of the present transport. And Druse, Sr. requires not only another motorized vehicle to pull the trailer, but yet another machine to load the rolls onto his trailer. The present invention provides for self loading and transport of the rolls by a single vehicle and operator.

Finally, U.S. Pat. No. 5,305,844 issued to Edgar A. Ducote on Apr. 26, 1994 describes Remote Steering Of On-Highway Vehicles. The only similarity to the present invention is the use of U-joints or the like in the steering column; as is well known. No means is disclosed to move the steering wheel from one side of the chassis to the other, as required with the laterally movable cab of the present hay roll transporter. Ducote relates to multiple wheel steering, which is beyond the scope of the present invention.

None of the above noted patents, taken either singly or in combination, are seen to disclose the specific arrangement of concepts disclosed by the present invention.

SUMMARY OF THE INVENTION

By the present invention, an improved hay roll transporter is disclosed.

Accordingly, one of the objects of the present invention is to provide an improved hay roll transporter which is in the general configuration of a truck and which is self propelled and adapted to being licensed and driven on public roads, as well as being used as a farm or agricultural vehicle.

Another of the objects of the present invention is to provide an improved hay roll transporter which is adapted to load plural large rolls of hay thereon, carry the rolls to a destination, and to unload and stack the rolls for storage or further transport.

Yet another of the objects of the present invention is to provide an improved hay roll transporter which is adapted to carry the plural large hay rolls in two rows along the bed of the truck.

Still another of the objects of the present invention is to provide an improved hay roll transporter which includes front loading and unloading means, which means is laterally translatable from one side to the other of the front of the truck in order to distribute the loading evenly.

A further object of the present invention is to provide an improved hay roll transporter which truck cab is also laterally translatable from one side to the other of the front of the truck, in order to provide clearance for direct loading and unloading of hay rolls on the truck by the front loading and unloading means.

An additional object of the present invention is to provide an improved hay roll transporter which includes control means within the movable cab, which control means are continuously connected and operable at any cab position.

Another object of the present invention is to provide an improved hay roll transporter which includes a movable bed rack for each row of hay rolls to be loaded thereon, which bed rack is adapted to transfer each hay roll from the front rack to the bed of the truck for carriage thereon.

Yet another object of the present invention is to provide an improved hay roll transporter at least which various hay roll handling mechanisms are power operated, whereby the transporter may be operated by a single individual to pick up and load, transport, and unload any hay rolls to be handled.

Still another object of the present invention is to provide an improved hay roll transporter which includes hydraulic power means providing power for at least the hay roll handling mechanisms, but which may include alternative hay roll handling power means if desired.

A final object of the present invention is to provide an improved hay roll transporter for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
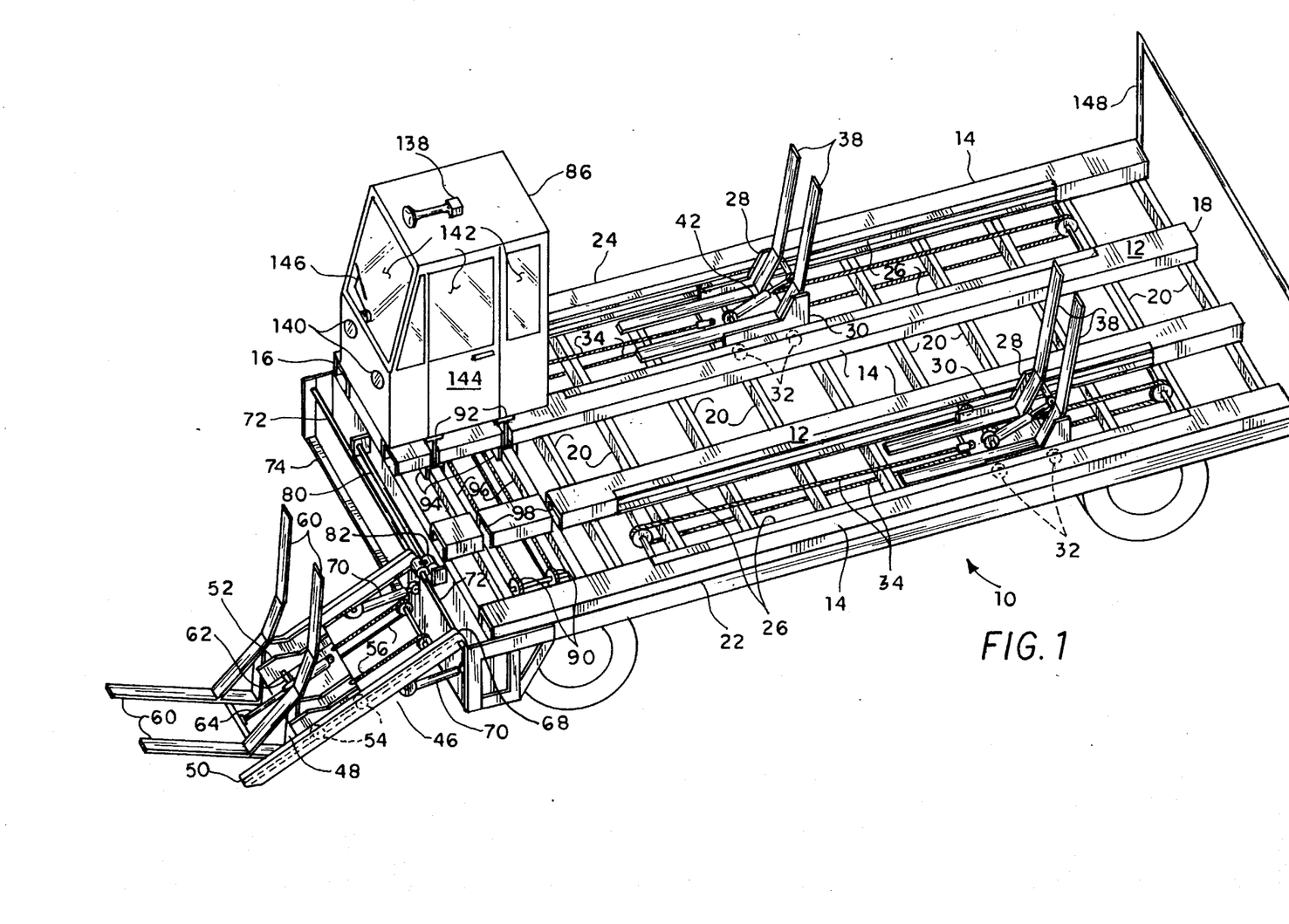
FIG. 1 is a perspective view of the present hay roll transporter, showing its general configuration and mechanisms.

Referring now particularly to FIG. 1 of the drawings, the present invention will be seen to relate to a self propelled hay roll transporter truck 10 providing for the pickup of large, generally cylindrical hay rolls in the field, transporting the hay rolls to another location either by public roads or off road, and depositing the hay rolls at the destination, without requiring any other vehicles, equipment, or labor other than the single operator of the transporter 10. While the present disclosure refers to the transporter 10 being used for the pickup and carriage of hay rolls, it will be understood that it may also be used for the pickup, transport, and delivery of other large, heavy objects, such as hay bales and the like, if desired.

The transporter 10 generally comprises a relatively large and flat bed 12, defined by a plurality of longitudinal members 14 extending from the front end 16 to the rear end 18 of the bed 12. The longitudinal members 14 may be relatively wide and shallow inverted U-shaped steel channels, or other suitable material as desired. Preferably, four such members 14 are spaced apart to form a left side pair and a right side pair, and are supported by a plurality of lateral crossmembers 20 extending from the left side 22 to the right side 24 of the bed, which crossmembers 20 may also be formed of steel channel components, or other materials as desired. The bed 12 of the prototype transporter 10 is on the order of thirty five feet in length by nine feet in width; however, other dimensions may be used as desired. It may be desirable to restrict the maximum width so as not to exceed the nine foot width of the prototype to a great extent, however, in order to allow for travel on public roads without special permit.

Each of the longitudinal members 14 has a section removed along the majority of its length, with the removed sections of each member 14 comprising a pair, facing one another so that the members 14 of each pair are in mirror image. Another channel component is inserted in the cutaway section of each channel 14, and placed on its side to form two mutually facing channels or tracks 26 in each pair of longitudinal members 14. These bed tracks 26 are on the order of twenty seven feet on the prototype, and thus extend substantially the length of the bed 12; their lengths may be modified as desired. The two pairs of bed tracks 26 provide for the retention of the wheels of a left and a right bed rack 28, which bed racks 28 move longitudinally along the bed 12.

Figure 5:
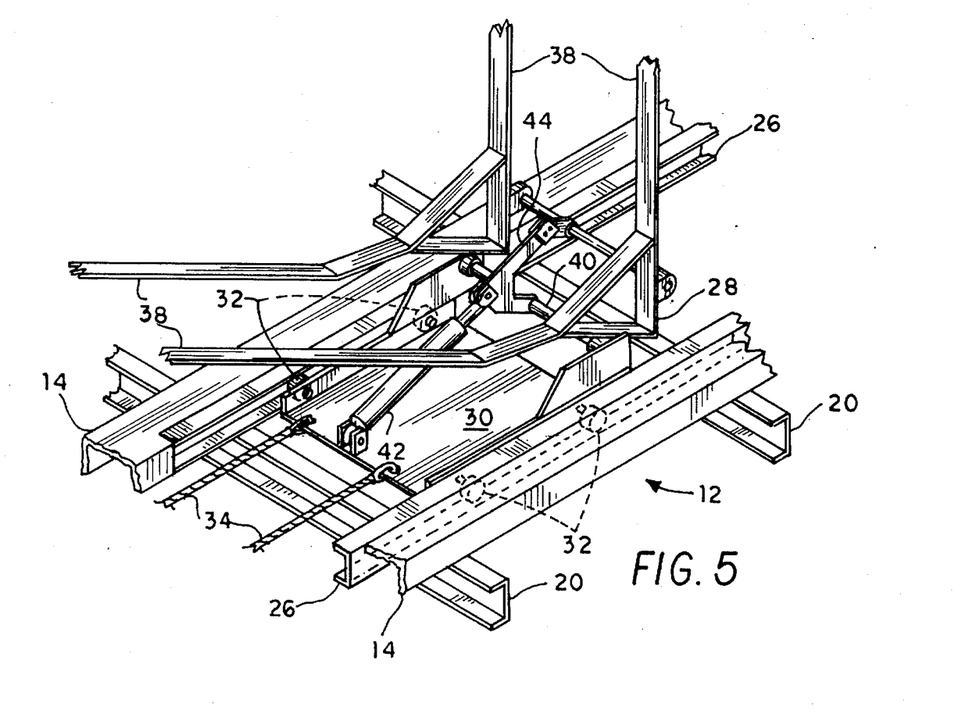
FIG. 5 is a left side perspective view of a bed rack and tracks, showing the connection means to the truck and longitudinal translation means.
Figure 6:
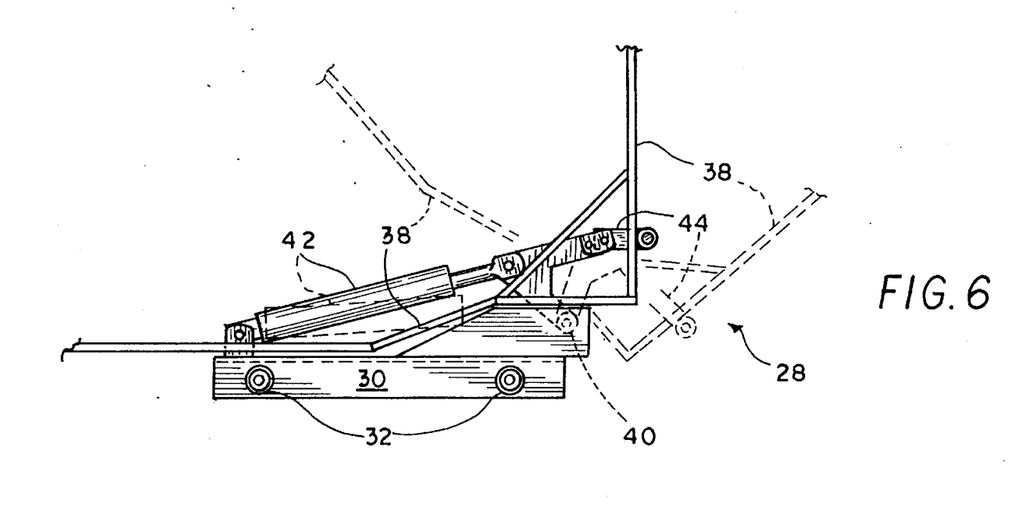
FIG. 6 is a left side elevation view of one of the bed racks, showing its operation.

FIGS. 5 and 6 provide detailed views of one of the bed racks 28. A base 30 is provided, with wheels 32 disposed along the sides or edges thereof and engaging the facing channel members comprising each pair of tracks 26 for each bed rack 28. Each bed rack 28 is propelled along its respective pair of facing track channels 26 by a pair of cables, roller chains, or other suitable elements 34, each pair of which is preferably actuated by a conventional hydraulic motor 36 (shown schematically in FIG. 9, in order to provide clarity in the other drawing figures). Each bed rack 28 also includes a pair of forks 38, which are pivoted about a lateral axis 40 by a hydraulic cylinder 42 which drives an adjustable linkage 44. (The hydraulic system which actuates the cylinders 42, as well as the bed rack motors 36; is shown schematically in FIG. 9, and is discussed further below.) These bed racks 28 are thus able to pick up an object by means of the pivoting forks 38 and hold the object therein, and transfer the object essentially from one end of the bed 12 to the other, as required.

The present invention preferably includes two such bed racks 28, disposed side by side in parallel pairs of bed rack tracks 26 in the transporter bed 12. Such provision of two bed racks capable of working parallel to one another, allows two rows of material (hay rolls, etc. . . .) to be placed side by side on the transporter bed 12, thus essentially doubling the load which the present transporter 10 may carry. However, smaller (particularly narrower) versions of the present transporter 10 may include only a single bed rack thereon, if desired, although such would limit the capacity of such a vehicle.

Figure 2:
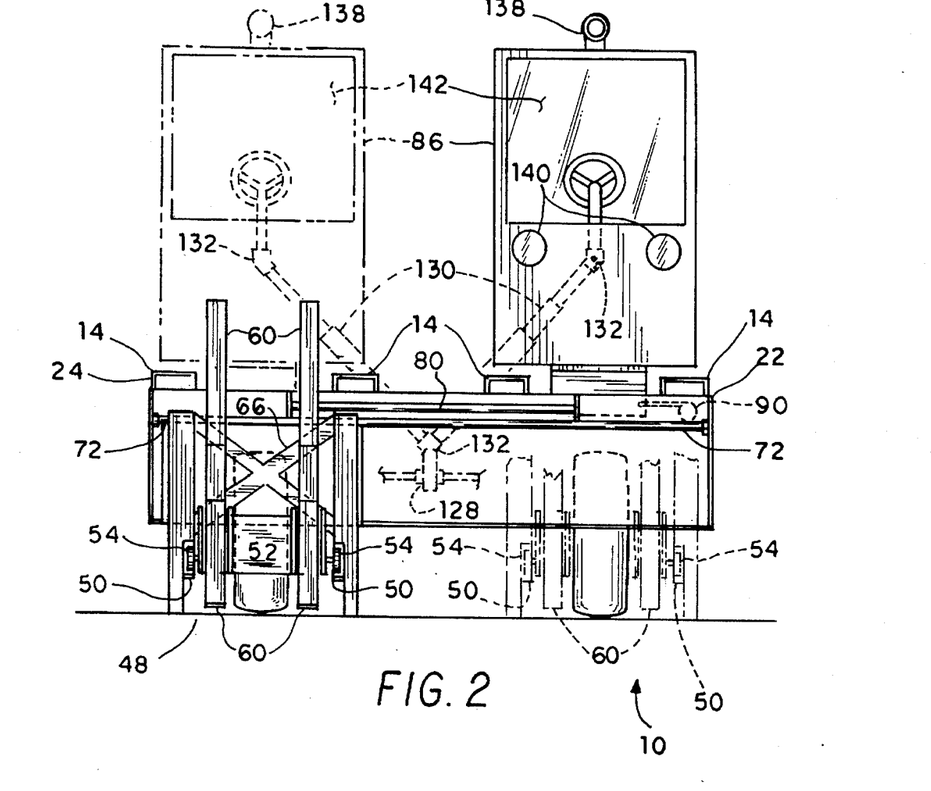
FIG. 2 is a front elevation view of the transporter, showing the lateral translation of the front loading and unloading ramp and the cab.
Figure 3:
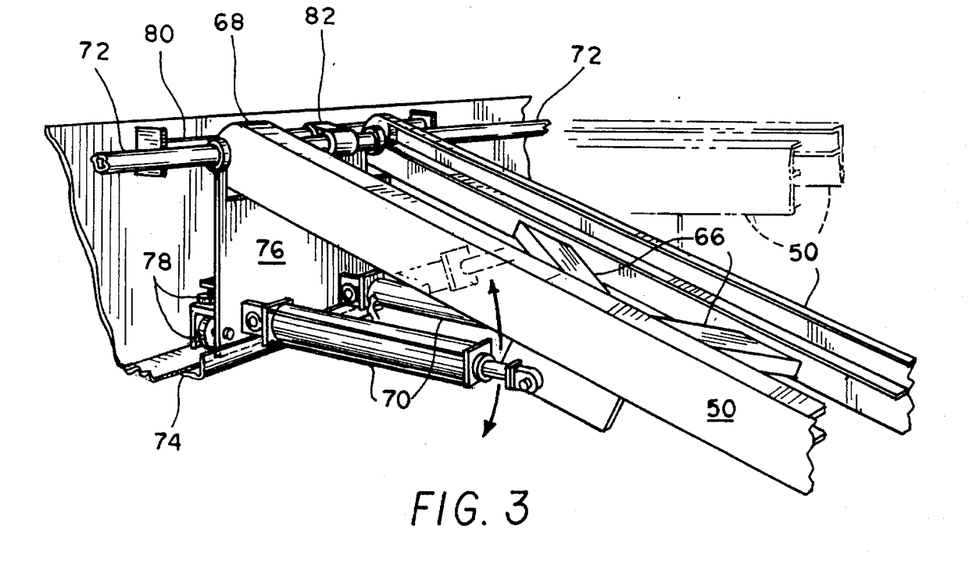
FIG. 3 is a broken away right side perspective view of the front loading and unloading ramp, showing details of its construction and operation.

Hay rolls or the like are lifted onto the bed racks 28 by means of a single front ramp 46 and front ramp rack 48, shown in FIGS. 1 through 3. The ramp 46 comprises two mutually facing channel sections 50, which serve as tracks for the front rack 48. The front rack 48 is substantially similar to the bed rack(s) 28 discussed above, and includes a base 52 which travels longitudinally between the two tracks 50 on wheels 54 contained within the two channels comprising the tracks 50. A pair of cables or chains 56 drive the front rack base 52 along the tracks or channels 50, and are in turn powered by a front rack or ramp lift movement hydraulic motor 58 (shown schematically in FIG. 9). A pair of front ramp forks 60 are pivotally actuated about a lateral axis 62, by one or more front ramp fork lift pivot hydraulic cylinders 64, which are connected to a linkage similar to the linkage 44 of the bed racks 28 discussed above. The two front ramp track channels 50 include cross bracing 66 therebetween (shown in FIGS. 2 and 3, but deleted from the other figures for clarity) for rigidity, as they are not rigidly affixed to the truck bed members 14, as are the bed tracks 26 for the bed racks 28.

In addition to the pivoting and traveling actuation of the front forks provided respectively by the hydraulic cylinder 64 and front ramp rack movement motor 58 (similar to the actions provided by the bed rack fork pivot cylinders 42 and travel motor 36 discussed above), the he front ramp assembly 46 may also be arcuately lifted about its bed attachment end 68 at the front end 16 of the transporter, and may also be laterally translated across the front end 16 of the transporter, from the left side 22 to the right side 24 of the bed 12. The arcuate lifting action is provided by a pair of front ramp lifting cylinders 70, which serve to arcuately lift and lower the distal forward end of the front ramp 46 as desired.

The lateral movement of the forward ramp 46 across the front end 16 of the truck 10, serves to align the forward ramp 46 and the front rack 48 thereon with one of the two bed racks 28, as desired. A transverse front rack pivot bar 72 extends from the left side 22 to the right side 24 of the transporter 10, immediately in front of the forward edge 16 of the bed 12, with a lower lateral track 74 serving to secure the bottom edge of a front ramp plate 76 to which the front ramp assembly 46 is secured. A set of wheels 78 disposed in both horizontal and vertical planes, is provided along the lower back portion of the from ramp plate 76 and between the plate 76 and the fixed front end of the truck 10, to accommodate vertical and rearward compressive loads as the ramp 46 is lifted. Further accommodation of loads is provided by a supplemental upper transverse bar 80 and a collar 82 which slides along the two bars 72 and 80 and serves to transfer loads from the primary bar 72 to the secondary bar 80. The lateral translation of the front ramp 46 is provided by a hydraulic motor 84 (FIG. 9) and chain assembly, similar to that described above for the bed racks 28.

Figure 4:
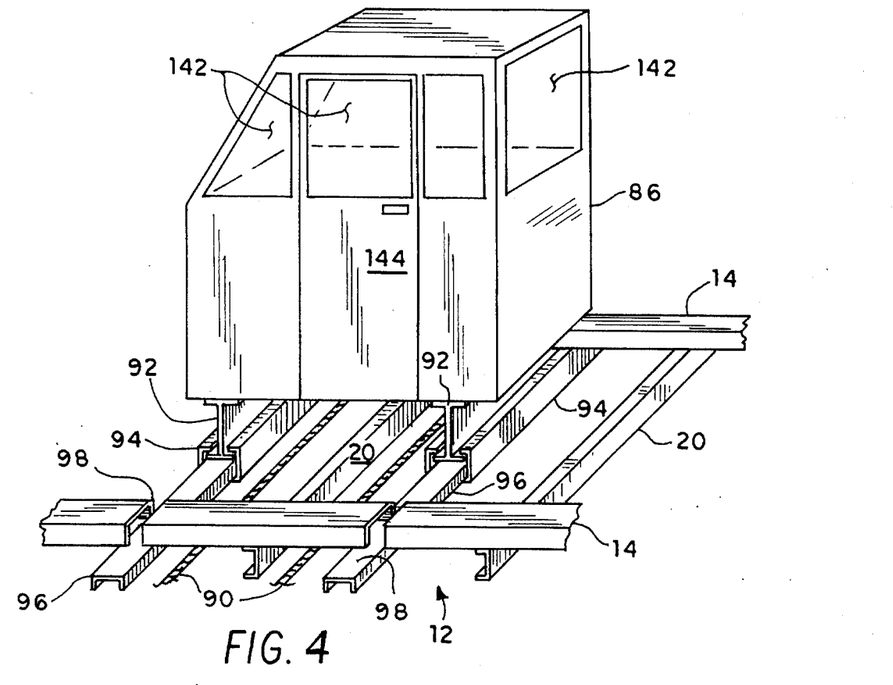
FIG. 4 is a left side perspective view of the cab of the truck, showing the specific configuration providing for lateral translation of the cab across the front of the truck chassis.

Obviously, any objects to be loaded from the front ramp 46 to the truck bed 12 will be blocked by the cab 86, if the front ramp 46 is positioned directly in front of the cab 86. If the cab 86 were fixed in position, then only one side of the bed 12 would be usable, or a much more complex arrangement would have to be provided to transfer hay rolls or the like-laterally from one side of the bed 12 to the other, around such a fixed cab. The present invention overcomes this problem by providing for the lateral translation of the entire cab 86 and controls located therein, across the front end of the bed 12, as shown in FIGS. 1, 2, and 4.

The cab 86 is laterally translated across the front of the truck 10 by means of a conventional hydraulic motor 88 (shown schematically in FIG. 9) and chain 90 (or cable or the like), similar to the other motors 36, 58, and 84 discussed further above for translational movement of the bed racks 28, front rack 48, and front ramp assembly 46. The cab 86 is supported by a pair of lateral I section members 92, which in turn have their bottom flanges captured within a pair of upwardly facing cab guide channels 94, serving to secure the cab 86 against fore or aft movement relative to the bed 12. The channels 94 are supported by a pair of cab support crossmembers 96. (Guide wheels or bearings, not shown, may be provided between the cab support I section members 92, the guide channels 94, and the cab support crossmembers 96 to reduce frictional forces during lateral translation of the cab 86.) The two innermost longitudinal bed members 14 have lateral slots 98 thereacross, providing for passage of the I section cab supports 86 therethrough when the cab 86 is laterally translated from one side of the bed 12 to the other.

Figure 8:
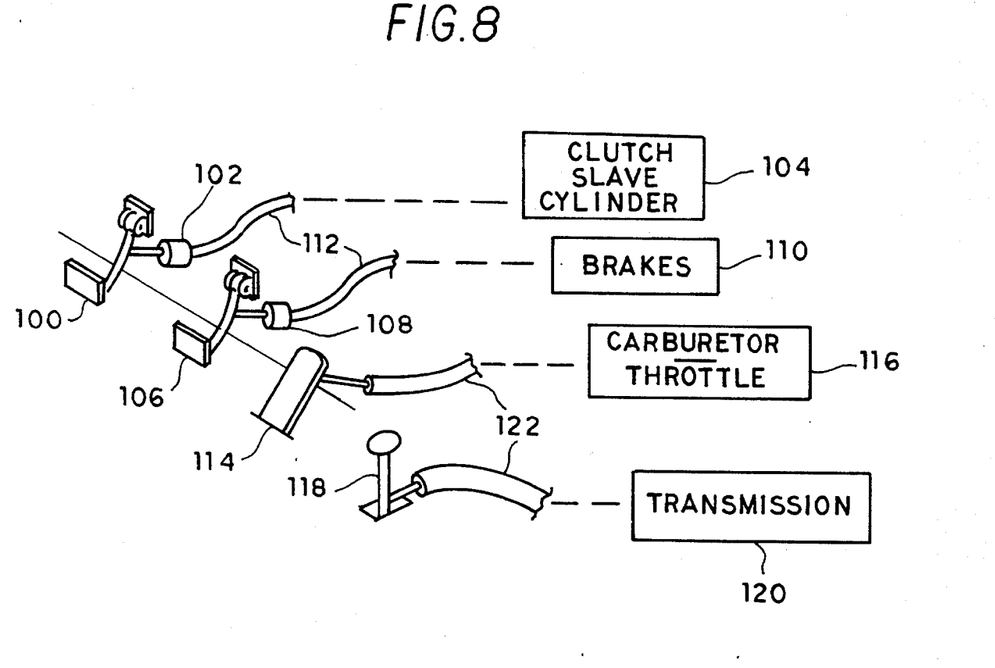
FIG. 8 is a broken away perspective view of the operating controls within the interior of the truck cab and a schematic representation of the truck operating systems, showing the flexible connection means between the movable cab and the operating systems.

The various transporter controls within the cab 86 may be connected to their respective systems by various flexible means, such as those disclosed in FIG. 8. Clutch operation (assuming the present transporter is equipped with a manual, rather than an automatic, transmission) may be provided by a clutch pedal 100 and clutch master cylinder 102 actuating a hydraulic clutch cylinder 104. The brake pedal 106 may conventionally actuate a brake master cylinder 108 for the hydraulic brakes 110 in a like manner, via flexible hydraulic lines 112. The throttle or gas pedal 114 may actuate the carburetor (or fuel injection system) 116, and the shift lever 118 may control the transmission 120, by means of flexible cables 122. While other control means are possible (e.g., electronic, etc ), the above hydraulic and mechanical cable systems are well proven in other applications and are relatively economical, durable, and easy to maintain.

Figure 9:
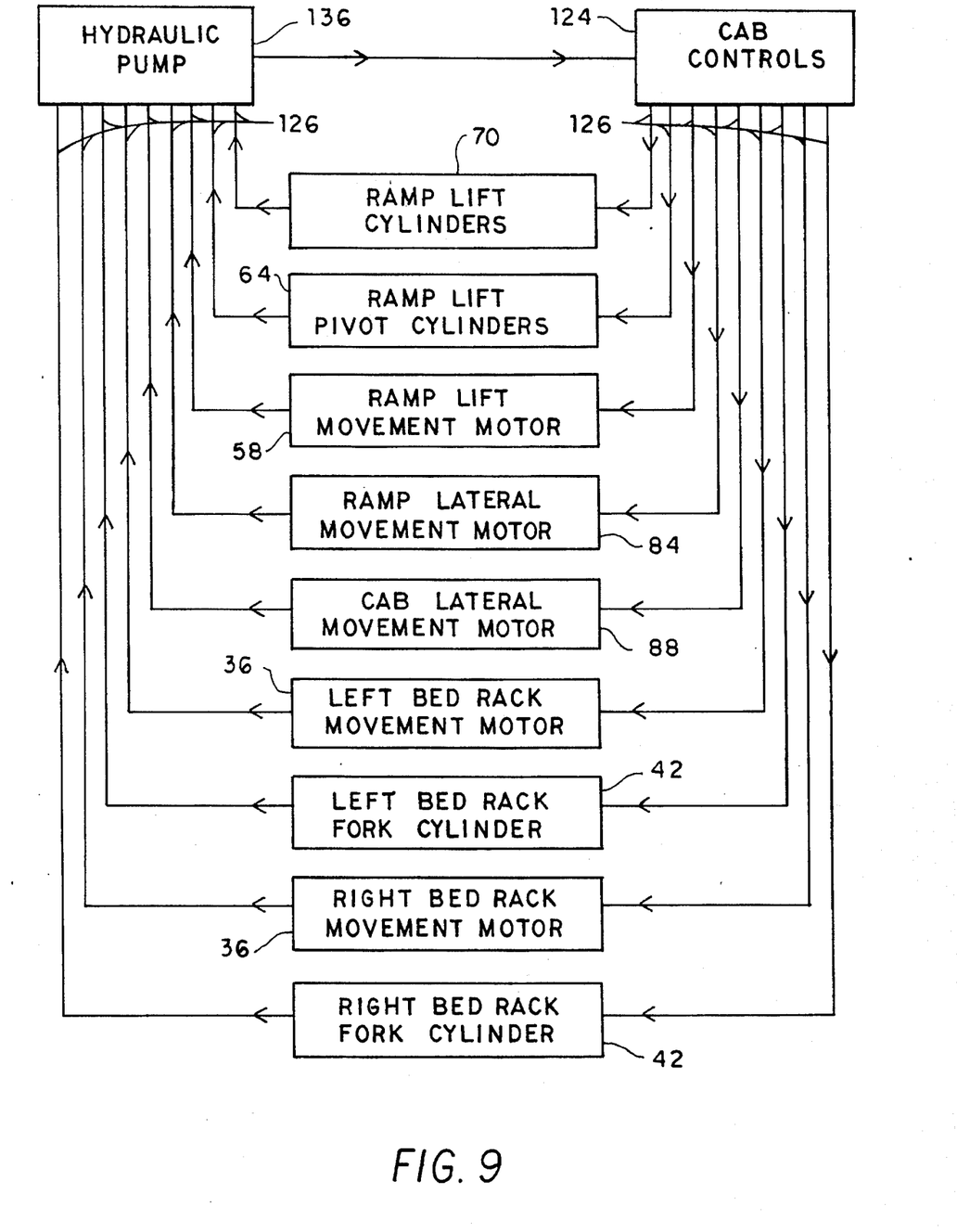
FIG. 9 is a schematic diagram of the hydraulic system and controls for operating the hay roll manipulating means of the present hay roll transporter.

In a like manner, the various hydraulic controls 124 discussed above for operation and movement of the bed racks 28, front ramp assembly and rack 46 and 48, and cab 86 may be connected by means of flexible hydraulic lines 126, shown schematically in FIG. 9. Thus, movement of the cab 86 may be easily accomplished without disruption of any control functions. Electrical wiring for lighting, etc. may also be flexibly connected to switches in the cab 86, as desired. The steering system for the laterally translatable cab 86 is shown in FIG. 2, with the steering box 128 being connected to the steering column 130 by plural U-joints 132 and conventional splined couplings or the like, to allow for the angular and length deflection of the steering column 130 as the cab 86 moves from one side to the other of the transporter 10. Other means (hydraulic, etc.) may be used, as desired.

Figure 7:
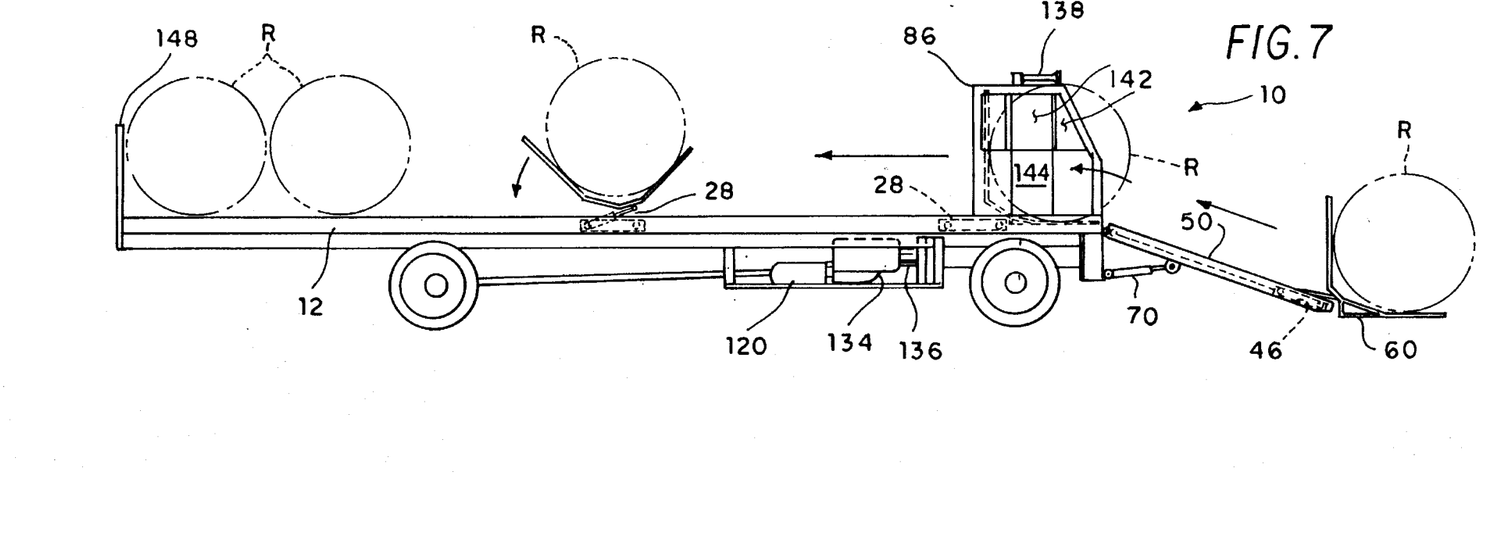
FIG. 7 is a right side elevation view showing the general configuration and operation of the truck.

The present transporter 10 is powered by a conventional internal combustion vehicle engine 134 (gasoline or diesel), as shown in the side elevation view of FIG. 7. The engine 134 provides power to drive the transporter 10 by means of the transmission 120, and further provides power for all of the hydraulically powered devices described above by means of a hydraulic pump 136 (also shown schematically in FIG. 9). Various other conventional hydraulic accessories (reservoir, accumulator, pressure relief valves, etc.) may also be included in the above system as required for operation. Preferably, the present transporter 10 is equipped for operation on public roads, and includes such equipment as an audible warning or signalling device (horn) 138, lights 140, windshield and other glass 142 for the cab 86 enclosure and door(s) 144, and windshield wiper(s) 146. Other equipment and instruments (not shown) may be provided as needed.

The present transporter 10 as described above, will be seen to provide for the picking up and loading of large hay rolls R in the field, the transport of such hay rolls R either off road or on public roads as required to a destination, and further for the off loading and stacking of such hay rolls R or the like onto another vehicle or for storage at the destination, all by a single operator. The operator of the transporter 10 need only drive the transporter 10 through the hay field and align one side of the truck 10 with the hay roll(s) R to be picked up. The front ramp 46 is positioned to the appropriate side of the transporter to align it with the hay roll R as needed, and the cab 86 is positioned to the side opposite the front ramp 46. (It may assist the operator in alignment, to have the cab 86 to the same side as the front ramp 46, until the ramp 46 is aligned) before moving the cab 86.)

When the front ramp 46 properly aligned, it is lowered and the front forks 60 pivoted or tilted forwardly, with the front tines parallel to the surface, and the front rack 48 moved forward to the distal end of the ramp. The truck 10 is then driven slowly forward to push the front fork tines under the hay roll R until the roll R is completely on the front forks 60; this is shown at the right end of the side elevation view of FIG. 7. The appropriate bed rack 28 is then positioned at its forwardmost limit of travel, adjacent the front end 16 of the truck bed 12, with the forks 38 pivoted forward so the forwardmost forks are substantially parallel to the longitudinal bed members 14. (It will be noticed that the forks are displaced from their lateral pivot axis 40, to position the tines below the upper surface of the bed members 14, in order to fit beneath a hay roll R or the like loaded onto the bed 12.)

At this point, the operator pivots or tilts the front forks 60 rearwardly, as in the configuration shown for the forks 38 shown in broken lines of the bed rack 28 of FIG. 6. In such a position, the hay roll R is securely retained within the right angle defined by the forks 60, add cannot shift as it is placed upon the truck 10. The operator then uses the appropriate controls to move the front rack 48 upwardly and rearwardly along the front ramps or tracks 50, to its rearmost travel position adjacent the front end 16 of the truck bed 12. The front ramp assembly 46 is then raised upwardly, to tilt the assembly 46 back toward the truck bed 12. The front forks 60 are then pivoted to their most rearward position, whereupon the narrower spacing of the rearmost tines (those which were upwardly disposed when the roll R was first picked up) allows them to fit between the forwardly disposed tines of the bed rack 28.

At this point, the forks 38 of the appropriate bed rack 28 are pivoted or tilted rearwardly, to lift and transfer the hay roll R from the front forks 60 of the front rack 48 and to cradle the hay roll R therein. The bed rack 28 is then moved rearwardly by means of the appropriate hydraulic controls, with an intermediate position showing a hay roll R being cradled within the bed rack 28 being shown in FIG. 7. The bed rack 28 is moved to the most rearward position available (depending upon the number of hay rolls R previously loaded, as indicated on the rear portion of the truck 10 shown in FIG. 7), and the forks 38 are tilted rearwardly to nest between the longitudinal bed members 14. The hay roll R will then be supported by the bed members 14 to each side of the bed rack 28, for transport.

Essentially, the above process is repeated until the transporter 10 is fully loaded, or until no further hay rolls R remain for pickup. In order to keep the load balanced laterally, the front ramp 46 may be shifted laterally across the front of the truck 10 after one or two hay rolls R are loaded, with the cab 86 being shifted to the opposite side. (e.g., the front ramp 46 may be shifted from the right side 24 to the left side 22, with the cab 86 being shifted from the left side 22 to the right side 24. The left side bed rack 28 is then used to move and position the hay roll R on the truck bed 12.) Once the truck 10 is fully loaded, the hay rolls R thereon cannot roll forward due to the location of the cab 86 to the front of the bed on one side, and due to the opposite side bed rack 28 being positioned to hold the last loaded hay roll R thereon. The hay rolls R cannot fall from the rear end 18 of the transporter 10, due to a rear retaining bar 148 provided thereon.

Once the truck or transporter 10 is loaded as desired, it may be driven to the appropriate off loading location or destination by the same single operator who loaded the transporter 10, either off road or on public roads, as appropriate. Off loading of the transporter 10 is just as easily accomplished as the loading operation described above, by essentially reversing the operation. However, it will be noted that the capability of elevating the front ramp 46 for ground clearance while en route, and for assisting in loading operations, provides an additional benefit: Two vertical rows of hay rolls R may be stacked, by positioning a first row on the surface and then raising the forward or distal end of the front ramp 46 to off load further hay rolls R on top of the first row on the surface. Thus, the present transporter 10 not only provides for the pickup, transport, and off loading of such hay rolls R, but also for their compact storage by means of the ability to stack the rolls R one row atop another.

Although the present disclosure is directed to the handling of relatively large hay rolls R, that the present transporter 10 may be used for the pickup, carriage, and delivery of a multitude of other agricultural and non-agricultural articles. Conventional hay bales, large, heavy, and/or bulky machinery or equipment, etc. . . may also be carried using the present transporter 10, particularly for relatively short distances off road on farm property or the like. The present transporter 10 will be seen to be a highly versatile and labor saving device, which further reduces or eliminates the need for several other pieces of equipment to accomplish the task.

It is to be understood that the present invention is not limited to the sole embodiment described above, but encompasses any and all embodiments within the scope of the following claims.

I claim:

1. A hay roll transporter comprising:

a self propelled truck having a generally flat bed thereon, with said bed having a front end and an opposite rear end defining a length therebetween, and opposite first and second sides;

said truck further including a laterally translatable front ramp having a forward distal end and an opposite bed attachment end and extending from said front end of said bed, with said front ramp including front forks thereon adapted to provide for the pickup of a hay roll thereon;

said truck further including a laterally translatable cab disposed atop said front end of said bed, with said cab being movable to one of said sides of said bed when said front ramp is moved to an opposite one of said sides of said bed to provide for the direct loading and unloading of hay rolls to and from said bed by means of said front ramp and front forks, whereby;

said transporter picks up at least one hay roll and transfers the hay roll from said front ramp to said front end of said bed by means of said front forks, with said laterally translatable front ramp and cab being translated to opposite sides of said bed to provide for the pickup and placement of at least one ether hay roll alongside the first hay roll on said bed, and said transporter is driven to a destination for unloading any hay rolls thereon by reversal of the loading procedure.

2. The hay roll transporter of claim 1 wherein:

said front ramp is pivotable about a lateral axis adjacent said front end of said bed.

3. The hay roll transporter of claim 1 wherein:

said front forks are longitudinally movable along said front ramp between said distal end and said bed attachment end of said front ramp.

4. The hay roll transporter of claim 1 wherein:

said front forks are pivotable about a lateral axis.

5. The hay roll transporter of claim 1 wherein:

said bed includes at least one bed rack thereon, with said bed rack including at least two forks extending therefrom.

6. The hay roll transporter of claim 5 wherein:

said at least two forks of said bed rack are pivotable about a lateral axis.

7. The hay roll transporter of claim 5 wherein:

said bed includes longitudinal tracks thereon extending along the majority of said length of said bed from near said front end of said bed to near said rear end of said bed and providing for the support of said at least one bed rack thereon, and said at least one bed rack is movable along said tracks from a forward point adjacent said forward end of said bed to a rearward point adjacent said rearward end of said bed.

8. The hay roll transporter of claim 5 wherein:

said bed includes a first pair of longitudinal tracks on said first side of said bed and a second pair of longitudinal tracks on said opposite second side of said bed, with each said pair of longitudinal tracks extending along the majority of said length of said bed from near said front end of said bed to near said rear end of said bed, and said first pair of tracks providing for the support of a first said bed rack and said second pair of tracks providing for the support of a second said bed rack.

9. The hay roll transporter of claim 1 wherein:

said transporter includes at least steering, throttle, brake, and gearshift systems and respective controls therefor, with said controls being mounted within said cab and flexibly connected respectively to said systems for the selective operation thereof to allow for lateral translation of said cab.

10. The hay roll transporter of claim 9 wherein:

said steering system is mechanically actuated, said brake system is hydraulically actuated, and said throttle and gearshift systems are cable actuated.

11. The hay roll transporter of claim 1 wherein:

said transporter is adapted for use on public roads, and includes at least windshield wiper means, audible signaling means, and lighting means thereon.

12. A hay roll transporter comprising:

a self propelled truck having a generally flat bed thereon, with said bed having a front end and an opposite rear end defining a length therebetween, and opposite first and second sides, and including powered hay roll handling means comprising;

a laterally translatable front ramp having a forward distal end and an opposite bed attachment end and extending from said front end of said bed, with said front ramp being pivotable about a lateral axis adjacent said bed attachment end and including front forks longitudinally movable along said front ramp between said distal end and said bed attachment end of said front ramp, with said front forks further being pivotable about a lateral axis;

a laterally translatable cab disposed atop said front end of said bed, with said cab being movable across said bed, and;

at least one bed rack disposed upon said bed, with said at least one bed rack being movable along longitudinal tracks extending along the majority of said length of said bed from near said front end of said bed no near said rear end of said bed, and said at least one bed rack further including at least two forks mounted thereon and pivotable about a lateral axis, whereby;

said powered hay roll handling means of said transporter provides for the pick up, carriage, and delivery of at least one hay roll by a single operator of said transporter.

13. The hay roll transporter of claim 12 wherein:

said transporter includes an engine driven hydraulic pump, and said powered hay roll handling means are hydraulically operated.

14. The hay roll transporter of claim 13 wherein:

said front ramp is laterally translated by means of a hydraulic motor and chain, and pivoted by means of at least one hydraulic cylinder.

15. The hay roll transporter of claim 13 wherein:

said front forks are moved longitudinally along said front ramp by means of a hydraulic motor and chain, and said front forks are pivoted by means of at least one hydraulic cylinder.

16. The hay roll transporter of claim 13 wherein:

said cab is laterally translated across said front end of said bed by means of a hydraulic motor and chain.

17. The hay roll transporter of claim 13 wherein:

said at least one bed rack is movable by means of a hydraulic motor and chain.

18. The hay roll transporter of claim 13 wherein:

said forks of said an least one bed rack are pivoted by means of at least one hydraulic cylinder.

19. The hay roll transporter of claim 12 wherein:

said transporter is adapted for use on public roads, and includes at least windshield wiper means, audible signaling means, and lighting means thereon.

\* \* \* \* \*